United States Patent
Mishra et al.

(10) Patent No.: US 11,880,268 B2
(45) Date of Patent: Jan. 23, 2024

(54) SOFT ERROR AGGREGATION METHOD FOR DETECTION AND REPORTING OF RISKS IN A SAFETY INSTRUMENTED SYSTEM

(71) Applicant: Schneider Electric Systems USA, Inc., Foxboro, MA (US)

(72) Inventors: Ajay Mishra, Irvine, CA (US); Murugananth Muthuramalingam, Foothill Ranch, CA (US); Diana Ivanov, Mission Viejo, CA (US); Erna Banchik, Rancho Santa Margarita, CA (US)

(73) Assignee: Schneider Electric Systems USA, Inc., Foxboro, MA (US)

( * ) Notice: Subject to any disclaimer, the term of this patent is extended or adjusted under 35 U.S.C. 154(b) by 0 days.

(21) Appl. No.: 17/547,523

(22) Filed: Dec. 10, 2021

(65) Prior Publication Data
US 2023/0185648 A1   Jun. 15, 2023

(51) Int. Cl.
*G06F 11/00* (2006.01)
*G06F 11/07* (2006.01)
*G06F 11/30* (2006.01)

(52) U.S. Cl.
CPC ........ *G06F 11/0772* (2013.01); *G06F 11/076* (2013.01); *G06F 11/0778* (2013.01); *G06F 11/3041* (2013.01); *G06F 11/3075* (2013.01)

(58) Field of Classification Search
None
See application file for complete search history.

(56) References Cited

U.S. PATENT DOCUMENTS 6,701,480 B1 * 3/2004 Karpuszka .......... G06F 11/1056
714/766
10,379,946 B2   8/2019 Ueda et al.
(Continued)

FOREIGN PATENT DOCUMENTS

EP   2648100 A1   10/2013

OTHER PUBLICATIONS

Google Scholar/Patents search—text refined (Year: 2023).*
(Continued)

*Primary Examiner* — Christopher S McCarthy
(74) *Attorney, Agent, or Firm* — Locke Lord LLP

(57) ABSTRACT

A method for managing soft errors associated with one or more safety programmable logic controllers (PLCs) is provided. The method includes receiving an expected soft error rate for type(s) of input/output (I/O) modules over time, receiving respective soft error data that was aggregated by the respective safety PLCs based on soft errors detected by I/O modules coupled to the respective safety PLCs. Actual soft error rates are determined per I/O module type based on the received soft error data, and soft error rates are predicted for the safety PLC(s) per I/O module type. The actual and/or predicted soft error rates are compared to the expected soft error rate per I/O module type. The method further includes taking one or more actions in response to a threshold deviation between the actual and/or predicted soft error rates relative to the expected soft error rate for the corresponding I/O module type.

18 Claims, 5 Drawing Sheets

(56) References Cited

U.S. PATENT DOCUMENTS

| | | | | |
|---|---|---|---|---|
| 2007/0282457 | A1* | 12/2007 | Araki | G05B 19/0428 |
| | | | | 702/108 |
| 2008/0072116 | A1* | 3/2008 | Brittain | G06F 11/073 |
| | | | | 714/758 |
| 2013/0132056 | A1* | 5/2013 | Toba | G06F 30/367 |
| | | | | 703/14 |
| 2017/0031754 | A1* | 2/2017 | Chinnakkonda Vidyapoornachary | G06F 3/0619 |
| 2017/0351573 | A1* | 12/2017 | Ueda | G11C 29/52 |

OTHER PUBLICATIONS

Extended European Search Report for European Patent Application No. EP22202879.7, dated May 16, 2023.

Weichen, Liu, et al.: "Distributed Sensor Network-on-Chip for Performance Optimization of Soft-Error-Tolerant Multiprocessor System-on-Chip", IEEE Transactions On Very Large Scale Integration (VLSI) Systems, IEEE Service Center, Piscataway, NJ, USA, vol. 24, No. 4, Apr. 1, 2016 (Apr. 1, 2016), pp. 1546-1559, XP011603803, ISSN: 1063-8210, DOI:10.1109/TVISI.2015. 2452910. [retrieved on Mar. 18, 2016].

\* cited by examiner

SOFT ERROR AGGREGATION METHOD FOR DETECTION AND REPORTING OF RISKS IN A SAFETY INSTRUMENTED SYSTEM

TECHNICAL FIELD

The present disclosure relates to safety instrumented systems, and more particularly, to a soft error aggregation method for detection and reporting of risks in a safety instrumented system.

BACKGROUND

A safety instrumented system (SIS) is a system designed to monitor dangerous conditions in an industrial plant (also referred to as an operation unit), such as a mill, manufacturer, refinery, oil production site. The SIS is configured to take action in the event of a dangerous condition, such as when danger will result if no action is taken.

An SIS can include one or more safety programmable logic controllers that each monitor inputs from one or more input/output (I/O) modules. Each I/O module can be configured to receive many inputs from different respective sources. In this way, a modular configuration is provided for monitoring a scalable number of inputs.

Errors detected by an SIS can include hard errors and soft errors. A hard error is caused by malfunctioning hardware, commonly due to data transmission and storage devices. A hard error is not rectified when the computer is rebooted. A soft error, on the other hand, is not associated with hardware malfunction and is rectified when the computer is rebooted.

When soft errors are not differentiated from hard errors, the SIS can incorrectly interpret them as a hardware failure, which could trigger unwanted action by the SIS.

While conventional methods and systems for monitoring dangerous conditions in an operation unit have generally been considered satisfactory for their intended purpose, there remains a need for improvements.

SUMMARY

The purpose and advantages of the below described illustrated embodiments will be set forth in and apparent from the description that follows. Additional advantages of the illustrated embodiments will be realized and attained by the devices, systems and methods particularly pointed out in the written description and claims hereof, as well as from the appended drawings.

To achieve these and other advantages and in accordance with the purpose of the illustrated embodiments, in one aspect, disclosed is a method for managing soft errors associated with one or more safety programmable logic controllers (PLCs). The method includes receiving an expected soft error rate for one or more types of input/output (I/O) modules over time, receiving respective soft error data that was aggregated by respective safety PLCs of the one or more safety PLCs based on soft errors detected by I/O modules coupled to the respective safety PLCs. Actual soft error rates are determined per I/O module type based on the received soft error data and soft error rates are predicted for the one or more safety PLCs per I/O module type. The actual and/or predicted soft error rates are compared to the expected soft error rate per I/O module type. The method further includes taking one or more actions in response to a threshold deviation between the actual and/or predicted soft error rates relative to the expected soft error rate for the corresponding I/O module type.

In one or more embodiments, the one or more actions taken can include at least one action to reduce the amount of soft errors detected.

In one or more embodiments, the method can include outputting a visual display of the actual and/or predicted soft error rates, and one or more ranges of deviation for determining when the threshold deviation is reached.

In one or more embodiments, the one or more ranges can be based on the aggregated amount of soft errors per I/O module type over an expected life time for an I/O module of the same type.

In one or more embodiments, the one or more ranges can include a normal soft error range for which no action is taken, an alert soft error range associated with a first amount of deviation and for which the one or more actions is a first type of action, and a warning soft error range associated with a second amount of deviation different from the first amount of deviation and for which the one or more actions is a second type of action is taken.

In one or more embodiments, the method can further include, in response to determining there is a threshold deviation between the actual and/or predicted soft error rates for a group of safety PLCs of the one or more safety PLCs, determining whether there is a threshold deviation between the actual and/or predicted soft error rate for a subgroup of the group of safety PLCs or an individual safety PLC of the group of safety PLCs. The method can further include identifying which subgroup or individual safety PLC is a cause of the threshold deviation based on a result of determining whether there is a threshold deviation for the subgroup of safety PLCs or the individual safety PLC.

In one or more embodiments, the method can further include, in response to identifying an individual safety PLC that is a cause of the threshold deviation, comparing soft error rates per I/O module of the safety PLC and/or per semiconductor component of a selected I/O module of the I/O modules of the safety PLC to expected soft error rates per I/O module and/or per semiconductor component. The method can further include identifying one or more of the I/O modules of the safety PLC that is a cause of the threshold deviation and/or one or more semiconductor components of the selected I/O module that is a cause of the threshold deviation based on the comparison to the expected soft error rates per I/O module and/or per semiconductor component.

In accordance with another aspect, disclosed is a method performed by a processor of a safety PLC. The method Includes receiving timestamped reports of soft errors that were detected by one or more I/O modules of the safety PLC, aggregating soft errors per type of I/O module, and reporting the aggregated, timestamped soft errors to an aggregator that is external to the safety PLC.

In one or more embodiments the aggregated, timestamped soft errors are reported with identification of a type of the respective I/O modules of the one or more I/O modules that detected the soft errors.

In accordance with still another aspect, disclosed is an aggregator communicating with one or more safety PLCs. The aggregator includes a memory configured to store instructions and a processor disposed in communication with the memory. The processor, upon execution of the instructions, is configured to receive an expected soft error rate for one or more types of input/output (I/O) modules over time, receive respective soft error data that was aggregated by respective one or more safety PLCs based on soft errors detected by I/O modules coupled to the respective one or more safety PLCs, and determine actual soft error rates per I/O module type based on the received soft error data. The processor, upon execution of the instructions, is further configured to predict soft error rates for the one or more safety PLCs per I/O module type, compare the actual and/or predicted soft error rates to the to the expected soft error rate per I/O module type, and take one or more actions in response to a threshold deviation between the actual and/or predicted soft error rates relative to the expected soft error rate for the corresponding I/O module type.

In one or more embodiments, the method can further include the one or more actions taken can include at least one action to reduce the amount of soft errors detected.

In one or more embodiments, the processor, upon execution of the instructions, can be further configured to output a visual display of the actual and/or predicted soft error rates, and one or more ranges of deviation for determining when the threshold deviation is reached.

In one or more embodiments, the one or more ranges can be based on the aggregated amount of soft errors per I/O module type over an expected life time for an I/O module of the same type.

In one or more embodiments, the one or more ranges can include a normal soft error range for which no action is taken, an alert soft error range associated with a first amount of deviation and for which the one or more actions is a first type of action, and a warning soft error range associated with a second amount of deviation different from the first amount of deviation and for which the one or more actions is a second type of action is taken.

In one or more embodiments, the processor, upon execution of the instructions, can be further configured to, in response to determining there is a threshold deviation between the actual and/or predicted soft error rates for a group of safety PLCs of the one or more safety PLCs, determine whether there is a threshold deviation between the actual and/or predicted soft error rate for a subgroup of the group of safety PLCs or an individual safety PLC of the group of safety PLCs, and identify which subgroup or individual safety PLC is a cause of the threshold deviation based on a result of determining whether there is a threshold deviation for the subgroup of safety PLCs or the individual safety PLC.

In one or more embodiments, the processor, upon execution of the instructions, can be further configured to, in response to identifying an individual safety PLC that is a cause of the threshold deviation, comparing soft error rates per I/O modules of the safety PLC and/or per semiconductor component of a selected I/O module of the I/O modules of the safety PLC to expected soft error rates per I/O module and/or per semiconductor component, and identify one or more of the I/O modules of the safety PLC that is a cause of the threshold deviation and/or one or more semiconductor components of the selected I/O module that is a cause of the threshold deviation based on the comparison to the expected soft error rates per I/O module and/or per semiconductor component.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

A more detailed description of the disclosure, briefly summarized above, may be had by reference to various embodiments, some of which are illustrated in the appended drawings. While the appended drawings illustrate select embodiments of this disclosure, these drawings are not to be considered limiting of its scope, for the disclosure may admit to other equally effective embodiments.

Identical reference numerals have been used, where possible, to designate identical elements that are common to the figures. However, elements disclosed in one embodiment may be beneficially utilized on other embodiments without specific recitation.

DETAILED DESCRIPTION

Figure 1:
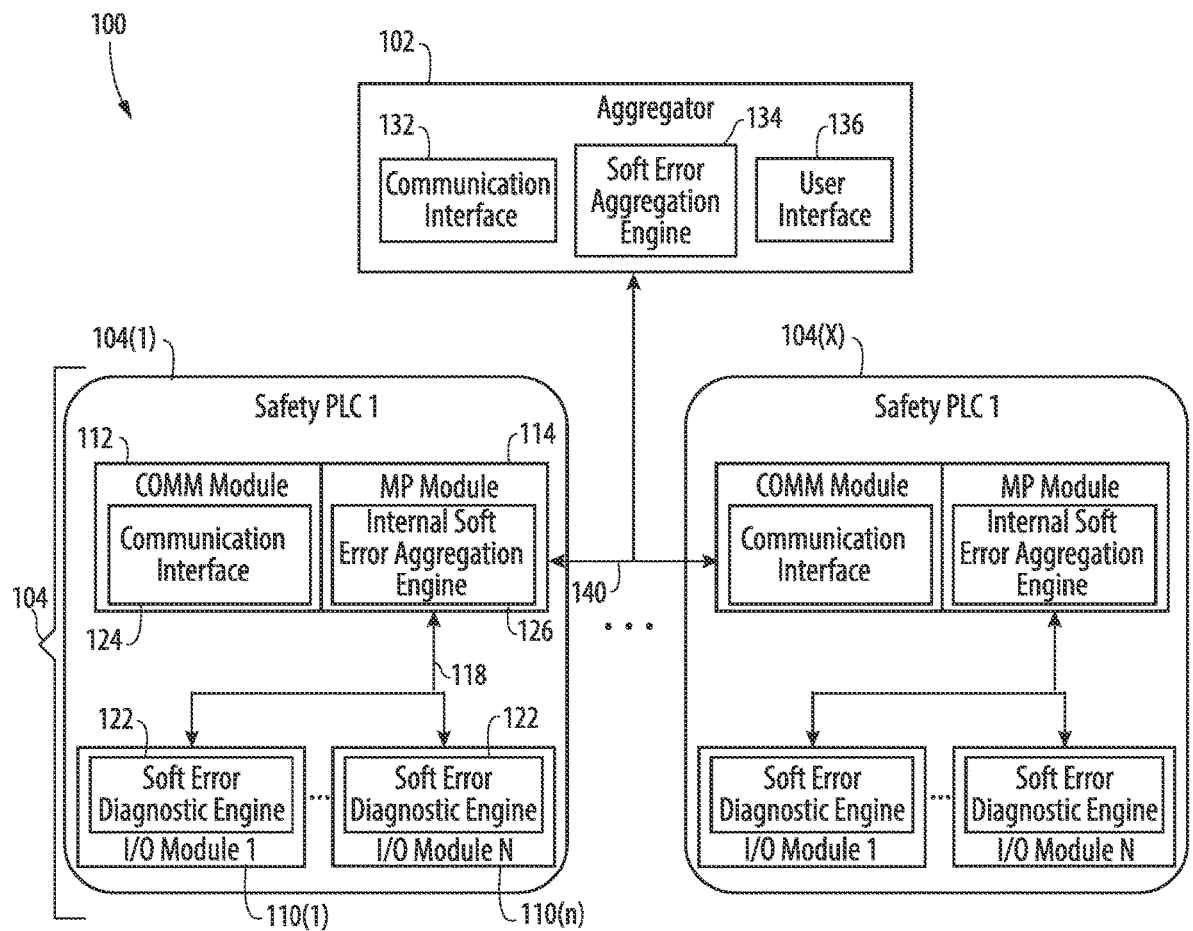
FIG. 1 is a block diagram illustrating an example safety instrumented system (SIS) having an aggregator for managing soft errors associated with one or more safety programmable logic controllers (PLCs), in accordance with an aspect of the disclosure.

With reference now to the drawings, for purposes of explanation and illustration, and not limitation, a block diagram of an exemplary embodiment of a safety instrumented system (SIS) in accordance with the disclosure is shown in FIG. 1, wherein the SIS is designated generally by reference character 100. Methods associated with monitoring one or more operation units with SIS 100 in accordance with the disclosure, or aspects thereof, are provided in FIGS. 2-6, as will be described.

With reference now to FIG. 1, SIS 100 includes an aggregator 102 and one or more safety PLCs 104(1)-104(X) (referred to generally as safety PLCs 104, wherein X is a positive integer, without limitation to a particular number) that communicate with aggregator 102 via communication links 140. Communication links 140 can be wired or wireless and can support communication via a network, such as local area network or a wide area network (e.g., the Internet).

Aggregator 102 and safety PLCs 104 are each computing devices having memory in communication with one or more processing units, such as a personal computer, smart mobile device, laptop computer, server, etc., wherein the processing units are configured to execute executable instructions stored by the corresponding memory. Aggregator 102 and safety PLCs 104 further each include and/or access one or more storage devices (such as included in storage 604 or in external component 608 shown in FIG. 6) for storing data and processing results (e.g., aggregated data, soft error rates, and expected error rates). The storage device can include computer system readable media in the form of volatile or non/volatile memory or storage media, such as random access memory (RAM), cache memory, a magnetic disk, an optical disk, etc.

SIS 100 can be in located at a single site, such as control room, or can be distributed across an industrial plant with PLCs 104 distributed over a large area, such as spaced by tens of kilometers. An end user, such as an owner of the asset, can operate and maintain an SIS for many years for monitoring operation of the industrial plant.

Safety PLCs 104 are computing devices each include one or more I/O modules 110(1)-110(N) (referred to generally as I/O modules 110, wherein N is a positive integer, without limitation to a particular number), a communication (COM) module 112, and a main processor (MP) module 114. I/O modules 110 communicate with MP module 114 via internal communication links 118 for reporting detected soft errors. Internal communication links 118 are typically hardwired links for purposes of signal integrity.

I/O modules 110 include hardware and/or software configured to receive input signals from a variety of sources that are being monitored for safety. The input signals can be analog and/or digital signals. Each I/O modules 110 can be provided in a separate chassis. Internal SE diagnostic engine 122 includes hardware and/or software configured to perform diagnostics to process the input signals, detect soft errors, and report detected soft errors to MP module 114. Internal SE diagnostic engine 122 may further perform actions to recover from soft errors. I/O modules 110 can have different types, such as digital input, digital output, digital login, and digital logout. Each I/O module is an intelligent device that can include, for example, an embedded processor, such as a microcontroller, field programmable gate array (FPGA), application specific integrated circuit (ASIC), etc.

COM module 112 includes hardware and/or software for communicating via one or more networks having communication links 140 with external processing devices, such as aggregator 102. MP module 114 includes hardware and/or software configured to receive and aggregate reported soft errors and report the aggregated soft errors to aggregator 102. MP module 114 further includes hardware and/or software configured to provide integrated safety functions that allow control of safety systems. COM module 112, and MP module 114 can be provided in one or more chasses that are separate from the chassis provided for I/O modules 110.

Aggregator 102 is a computing device that includes a communication interface 132, a SE aggregation engine 134, and a user interface 136. Communication interface 132 includes hardware and/or software configured to communicate via one nor more networks having communications links 140 with safety PLCs 104 to receive soft error data aggregated by respective safety PLCs 104. SE aggregation engine 134 includes hardware and/or software configured to aggregate the soft error data received from safety PLCs 104. User interface 136 includes hardware and/or software configured to receive data input (e.g., entered or selected) by a user and to output results of the analysis. For example, user interface 136 can provide a graphical user interface (GUI) by which the user can input data and/or by which data can be displayed to the user, e.g., by a display device. The results of the analysis can be displayed, e.g., via a dashboard, or otherwise output to a user and/or an external processing device.

Soft errors mostly affect the state of volatile semiconductor elements such as flip-flops, memory cells, etc. These in turn can affect execution sequence of a control program, resulting in incorrect behavior of the system, or change a constant value that should remain unchanged. Soft errors do not typically damage a circuit itself, but corrupt stored data or the state of the affected circuit. Some soft errors can be remedied by restarting the corresponding computer, while others require corrective action to restore the correct data.

Soft errors are caused by random radiation events that occur naturally in the terrestrial environment or by single event upsets from cosmic rays. Another cause of soft errors is due to small amounts of radioactive contaminants from early devices that emit alpha particles.

Aggregator 102 collects soft errors from all safety PLCs 104 of SIS 100 and aggregates the data. Although a certain amount of soft errors may be expected, by collecting and aggregating soft errors across SIS 100, a determination can be made whether the soft errors exceed an expected soft error rate, such as determined for a safety integrity level (SIL). Additionally, patterns of soft errors that exceed the expected soft error rate can alert a user that one or more particular safety PLCs 104 or I/O modules of one of the safety PLCs 102 is not running per designed assumptions of the SIL. The user can then re-assess, such as by performing a Process Safety Hazard Analysis or assessing Safety Instrumented Function Design, which can result in taking an action to change operation or design of the safety PLCs and/or recalculation of the SIL.

A result of analysis by aggregator 102 of the aggregated soft errors can indicate that environmental risks to the safety PLC 104 at a particular location are above the level assumed by the SIL and are assumed to be a cause of an elevated soft error rate associated with those safety PLCs 104. Aggregator 102 can cause an action to be taken based on this assessment, such as to relocate the safety PLCs 104 and/or to add protective housings to the affected safety PLCs 104.

An elevated soft error rate, e.g., due to soft errors in an I/O module 110, can be an indicator that semiconductor components are at risk of a hard failure in the future. For example, an elevated soft error rate associated with an I/O module 110 exceeds a predicted soft error rate for the I/O module. The predicted soft error rate can be based on expected soft errors over a life time of the I/O module. When the soft error rate is elevated, corresponding safety PLCs 104 and/or I/O modules 110 can be prone to execution of an unintended logic operation that can cause a fault which places the associated hardware in an unsafe state. Aggregator 102 can cause an action to be taken based on this assessment, such as replacement or repair of a particular I/O module 110 or a particular safety PLC 104 prior to the occurrence of a hard failure.

Using aggregator 102, the number of safety PLCs 104 included in SIS 100 can be scaled up without comprising detection of unacceptable soft error rates. Even when scaled up, the assessment can determine whether an elevation in soft error rates is a trend, is associated with a particular location of one or more safety PLCs 104, or is associated with a particular I/M module 110. By drilling down further in the analysis, aggregator 102 can identify particular semiconductor components of an I/M module 110 that have elevated soft errors, which can be of particular interest to a manufacturer of the associated I/M module 110.

The method performed by SIS 100 for monitoring soft error rates can include the diagnostic engine 122 of the respective modules I/O modules 110 per safety PLC 104 logging each detected soft errors with a timestamp, and optionally an identification of the associated semiconductor component (component ID), as soft error data. The internal soft error aggregation engine 126 of the corresponding MP module 114 aggregates soft error data for all I/M modules of its safety PLC 104. For example, the MP module 114 of each safety PLC 104 can poll the coupled internal soft error aggregation engines 126 in order to gather the timestamped soft errors. In other embodiments, the internal soft error aggregation engines 126 can use a different communication scheme, such as by providing the timestamped soft errors (optionally, per semiconductor component) at regular intervals or in response to an event.

Aggregator 102 can communicate with safety PLCs 104 via their respective COM modules 112 to obtain soft error data from all safety PLCs 104. For example, aggregator 102 can send requests to each safety PLC 104, and the safety PLCs 104 can respond to the request with its particular aggregated soft error data and an associated PLC ID that identifies the particular safety PLC 204. In other embodiments, the aggregator 102 and safety PLCs 104 can use a different communication scheme.

Aggregator 102 can aggregate the soft error data by counting soft errors that occurred over a sliding window with a selected resolution, such as per day, month, year, etc., for calculating the soft error rate. The soft error rate can be determined per selected parameters. The parameters can be preconfigured, user selectable, or automatically selected, e.g., based on previous anomalous results. For example, soft error rates can be selected for all safety PLCs 104, per safety PLC 104, for a selected group of safety PLCs 104 (e.g., within a selected geographic region, or for particular safety PLCs 104 having associated soft error rates that exceeded expected rates), per I/O module 110, per a selected group of I/O modules 110 (e.g., based on manufacturer or model of the I/O modules, based on type, or for I/O modules having associated soft error rates that exceeded expected rates, etc.), per semiconductor component, and/or per a selected group of semiconductor components (e.g., based on manufacturer or model of the semiconductor components or for particular semiconductor components having associated soft error rates that exceeded expected rates).

Aggregator 102 can further execute an algorithm to define environmental risk for a safety PLC 104 or group of safety PLCs 104 (e.g., all safety PLCs of the SIL or selected PLCs 104 (e.g., per geographic location)) as low, medium and high risk based on calculated soft error data rates. The designation of risk level is derived from a rate (e.g., a maximum rate) defined by a manufacturer of the safety PLC 104.

In one or more embodiments, to assess the risk level of a group of safety PLCs of SIS 100 (e.g., selected safety PLCs 104 or all of SIS's safety PLCs 104), aggregator 102 receives an expected soft error rate over the life of one safety PLC as defined by the manufacturer or the like, e.g., 1000 soft errors over 2 yrs. The term "receive" with respect to receipt of data is meant to be interpreted broadly, and can include, for example, receive via transmission, retrieve, request and receive, access a location in memory, read, or otherwise obtain.

Aggregator 102 calculates an aggregation of the soft error rate over the useful life of one safety PLC as defined by the manufacturer and/or asset owner (or the like) and draws a curve of the expected soft error rate on a linear graph.

Aggregator 102 aggregates a statistic (e.g., average, mean, high) of the soft error rate for the group of safety PLCs 104 over a period of time from (e.g., from initial startup) and draws a curve of the predicted soft error rate on the linear graph to predict soft error rate at end of useful life of the safety PLC 104.

Based on trend line deviation between the curve of the actual soft error rate and/or predicted soft error rate relative to the curve for the expected soft error rate, aggregator 102 generates warnings or alerts and based on the prediction level. These warnings and alerts can further cause actions to be taken.

Actual and predicted curves for soft error rates can be determined and plotted for any selected group of safety PLCs in SIS 100, and then compared to the curve of the expected soft error rate.

In a similar way, the expected soft rate error for particular types of I/O modules 110 can be determined for the useful life of the type of I/O module as a function of manufacturer-provided data, which can be plotted on a linear graph as a curve of an expected soft error rate for an I/O module type. Actual and predicted curves for soft error rates can be determined and plotted for any selected group of the type of I/O modules 110 in one or more selected safety PLCs 104 or in SIS 100. Alerts or warnings can be generated and actions taken based on trend line deviation between the curves of the actual soft error rate and/or predicted soft error rate relative to the curve for the expected soft error rate for the I/O module type.

Figure 2:
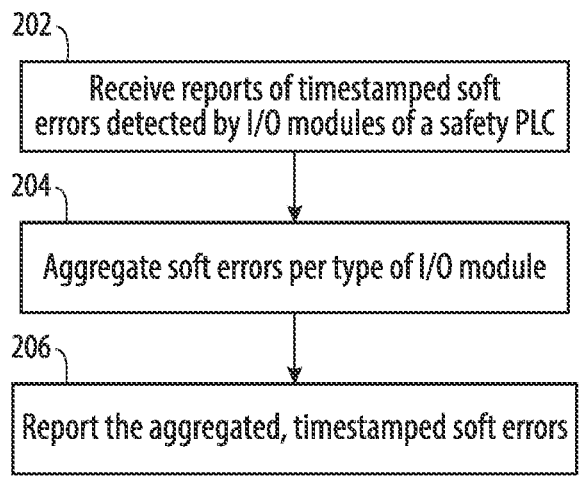
FIG. 2 is a flowchart showing an example method performed within a safety PLC for aggregating soft errors, in accordance with an aspect of the disclosure.
Figure 3:
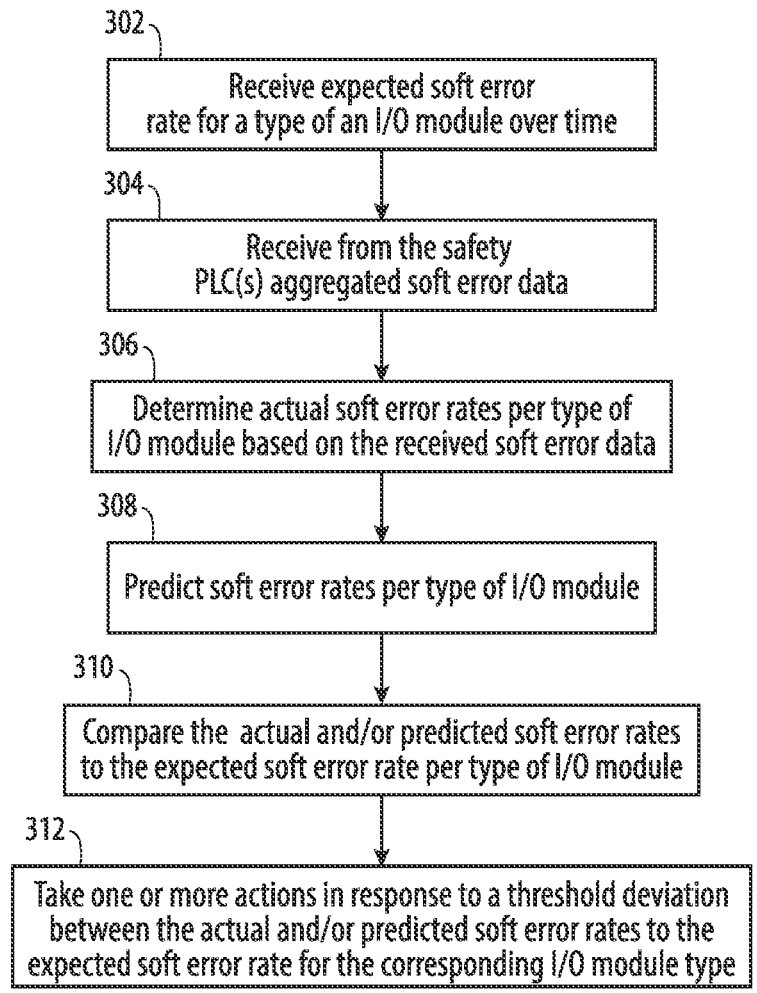
FIG. 3 is a flowchart showing an example method performed by an aggregator of the SIS for aggregating errors across the SIS and determining soft error rates, in accordance with an aspect of the disclosure.
Figure 4:
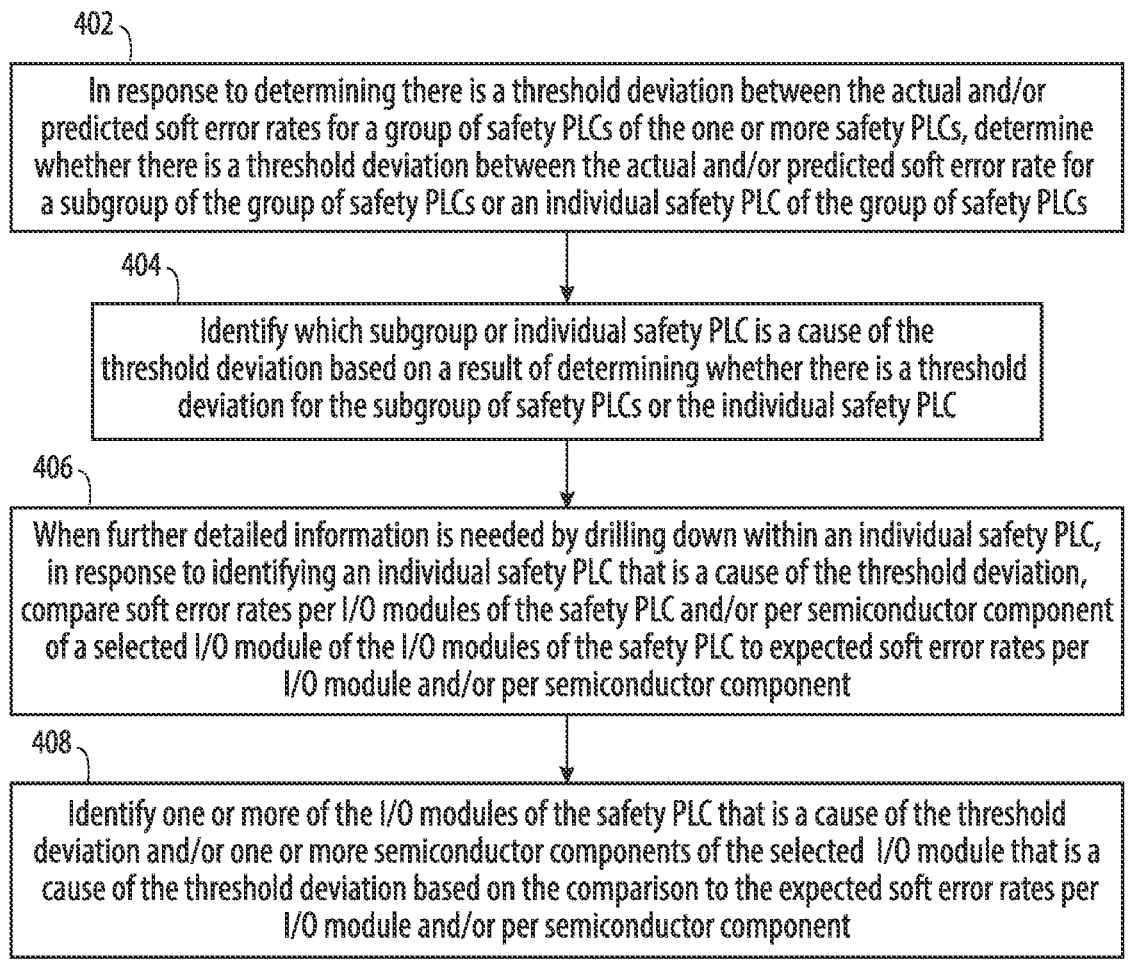
FIG. 4 is a flowchart showing an example method performed by the aggregator when investigating a soft error rates of the SIS in greater detail, in accordance with an aspect of the disclosure.

With reference now to FIGS. 2-4, shown are flowcharts demonstrating implementation of the various exemplary embodiments. It is noted that the order of blocks shown in FIGS. 2-4 is not required, so in principle, the various blocks may be performed out of the illustrated order. Also certain blocks may be skipped, different blocks may be added or substituted, some blocks may be performed in parallel instead of strictly sequentially, or selected blocks or groups of blocks may be performed in a separate application following the embodiments described herein.

Language that refers to the exchange of information is not meant to be limiting. For example, the term "receive" as used herein refers to obtaining, getting, accessing, retrieving, reading, or getting a transmission. Use of any of these terms is not meant to exclude the other terms. Data that is exchanged between modules can be exchanged by a transmission between the modules, or can include one module storing the data in a location that can be accessed by the other module.

FIG. 2 shows a flowchart of blocks performed by a safety PLC and its main processor module for aggregating soft errors detected by I/O modules, such as safety PLC 104, main processor module 114, and I/O modules 110 shown in FIG. 1. At block 202, reports are received of soft errors that were detected by I/O modules of the safety PLC. The reports can include a timestamp of the time of detection. At block 204, soft errors are aggregated per type of I/O module. At block 206, the aggregated, timestamped soft errors are reported as aggregated soft error data to an aggregator that is external to the safety PLC, such as aggregator 102 shown in FIG. 1.

FIG. 3 shows a flowchart of blocks performed by an aggregator, such as aggregator 102 shown in FIG. 1. At block 302, expected soft error rate for a type of an I/O module over time is received. At block 304, respective aggregated soft error data is received from the safety PLC(s). At block 306, actual soft error rates are determined per type of I/O module based on the received soft error data. At block 308, future soft error rates for the safety PLC(s) are predicted per type of I/O module. The determination and prediction of soft error rates can be for all safety PLCs reporting to the aggregator, or for a selected group of safety PLCs or individual safety PLCs. At block 310, the actual and/or predicted soft error rates are compared to the expected soft error rate per type of I/O module. At block 312, one or more actions are taken in response to a threshold deviation between the actual or predicted soft error rates relative to the expected soft error rate for the corresponding I/O module type.

FIG. 4 shows a flowchart of blocks performed by the aggregator when drilling down to identify a cause of threshold deviation. At block 402, in response to determining there is a threshold deviation between the actual and/or predicted soft error rates for a group of safety PLCs of the one or more safety PLCs, it is determined whether there is a threshold deviation between the actual and/or predicted soft error rate for a subgroup of the group of safety PLCs or an individual safety PLC of the group of safety PLCs.

At block 404, identification is made regarding which subgroup or individual safety PLC is a cause of the threshold deviation based on a result of determining whether there is a threshold deviation for the subgroup of safety PLCs or the individual safety PLC.

At block 406, when further detailed information is needed by drilling down within an individual safety PLC, in response to identifying an individual safety PLC that is a cause of the threshold deviation, soft error rates per I/O modules of the safety PLC and/or per semiconductor component of a selected I/O module of the I/O modules of the safety PLC are compared to expected soft error rates per I/O module and/or per semiconductor component.

At block 408, one or more of the I/O modules of the safety PLC are identified that are a cause of the threshold deviation and/or one or more semiconductor components of the selected I/O module are identified that are a cause of the threshold deviation based on the comparison to the expected soft error rates per I/O module and/or per semiconductor component.

Figure 5:
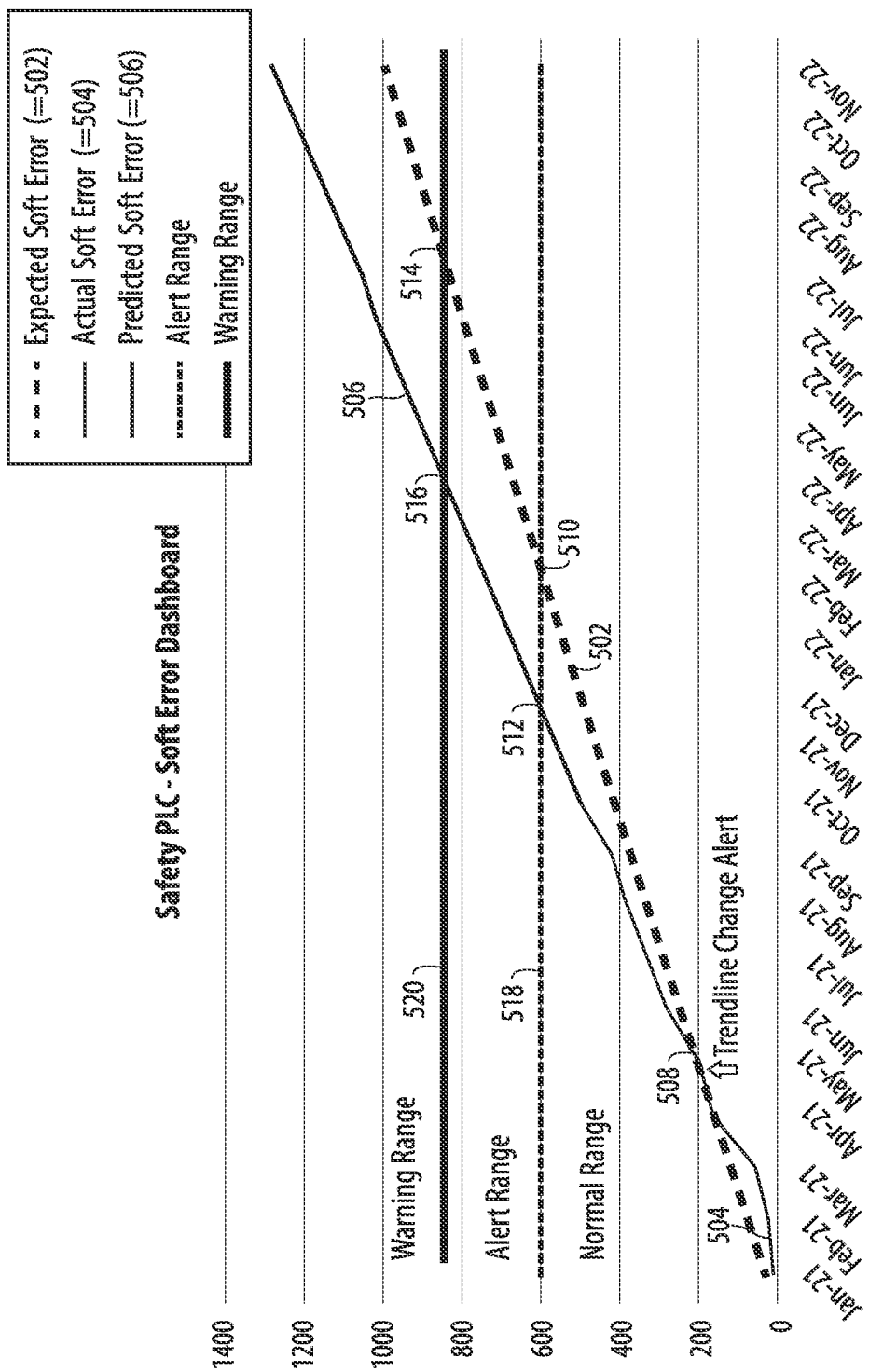
FIG. 5 shows an example graph with curves for expected, actual, and predicted soft error rates relative to various thresholds for different ranges of operation, in accordance with an aspect of the disclosure.

With reference to FIG. 5, a graph is shown with a curve 502 for expected soft error rates for a type of I/O module determined over the expected life of the I/O module. Also shown is a curve 504 for an actual soft error rate based on soft error data aggregated by a safety PLC over time, such as until the current time. Curve 506 is a linear prediction of a soft error rate based on projecting the actual soft error rate shown in curve 504 into the future. Curve 506 can be determined using techniques, such as linear regression, moving average models, etc. The graph can be displayed, for example, as a dashboard provided by user interface 136 of aggregator 102 shown in FIG. 1.

Point 508 is a point at which the amount of actual soft errors (or predicted soft errors) exceeds the predicted soft errors, as indicated by actual soft error curve 504 (or predicted soft error curve 506) crossing expected soft error curve 502. An alert can be output to indicate that the trend of the actual or predicted soft error rates has begun to veer away from the expected soft error rate.

The soft error rates can be considered to be within the normal range until the associated curve (actual soft error curve 504, predicted soft error curve 506, or expected soft error curve 502) cross an alert threshold 518, upon which the soft error rates are deemed to be in an alert range. Similarly, the soft error rates can be considered to be within the alert range until the associated curve (actual soft error curve 504, predicted soft error curve 506, or expected soft error curve 502) cross a warning threshold 520, upon which the soft error rates are deemed to be in a warning range.

Soft error rates can increase as the life of the safety PLC and its I/O modules progresses. The expected soft error curve 502 indicates a timeline when it is expected that the soft error rate will enter the alert or normal ranges. When the actual soft error curve 504 or predicted soft error curve 506 deviates from the expected soft error curve 502 and enters the alert or normal ranges earlier than expected, there may be reason for concern. The aggregator can determine to cause an action to be taken when the amount of deviation exceeds a threshold. For example, alert threshold 518 is crossed by expected soft error rate curve at point 510 and by predicted soft error rate curve 506 at point 512. The distance (measured in time) between points 510 and 512 is compared to a first threshold. If the first threshold is exceeded, the aggregator can cause a first type of action to be taken. Warning threshold 520 is crossed by expected soft error rate curve 502 at point 514 and by predicted soft error rate curve 506 at point 516. The distance (measured in time) between points 514 and 516 is compared to a second threshold. If the second threshold is exceeded, the aggregator can cause a second type of action to be taken, wherein the first and second actions can be different than one another. Some examples of first and second actions include investigating the problem locally, such as by placing a sniffer to sniff for radioactive activity, building a barrier to protect the affected portion of the plant from cosmic rays, change placement of affected portions of the plant to a lower altitude to avoid cosmic rays, etc.

Figure 6:
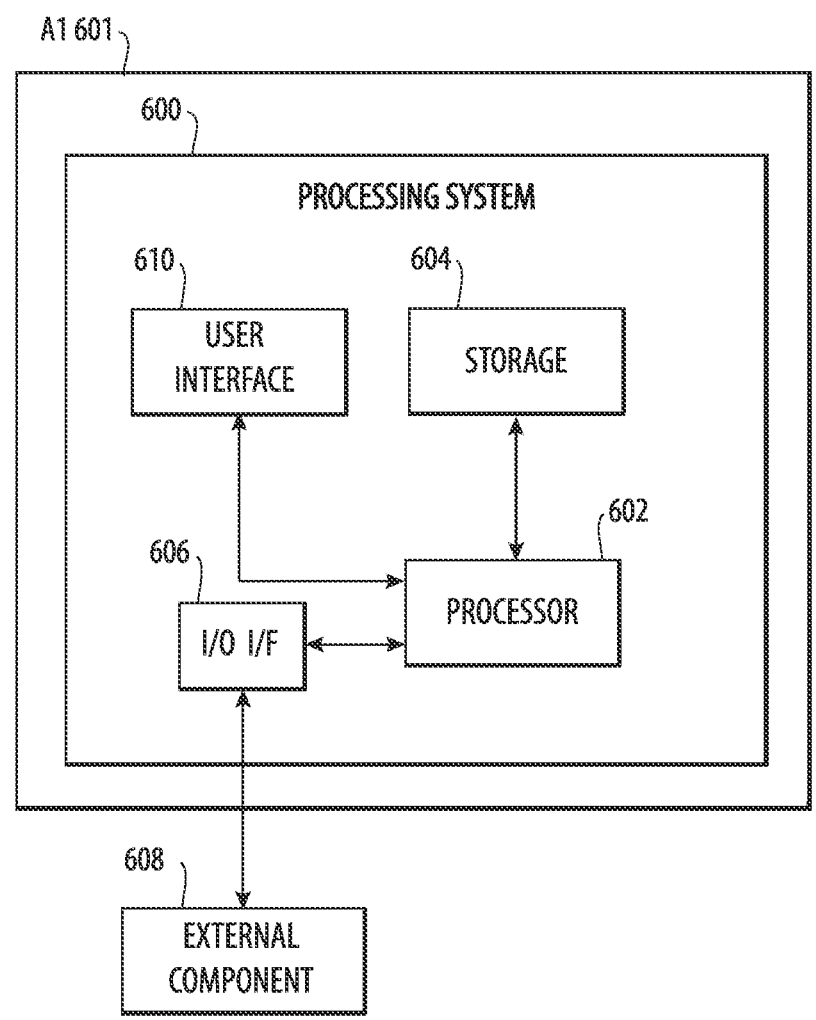
FIG. 6 is a block diagram of an exemplary computer system used by safety PLC(s) and the aggregator of the SIS, in accordance with embodiments of the disclosure.

With reference to FIG. 6, a block diagram of an example computing system 600 is shown, which provides an example configuration of a device A1 601 implemented using an example processing system. Device A1 601 can be any smart element included in SIS 100, such as I/O module 110, MP module 114, and aggregator 102 as shown in FIG. 1. Computing system 600 is only one example of a suitable system and is not intended to suggest any limitation as to the scope of use or functionality of embodiments of the disclosure described herein. Computing system 600 can be implemented using hardware, software, and/or firmware. Regardless, computing system 600 is capable of being implemented and/or performing functionality as set forth in the disclosure.

Computing system 600 is shown in the form of a general-purpose computing device. Computing system 600 includes a processing device 602, memory 604, an input/output (I/O) interface (I/F) 606 that can communicate with an internal component, such as a user interface 610, and optionally an external component 608.

The processing device 602 can include, for example, a programmable logic device (PLD), microprocessor, DSP, a microcontroller, an FPGA, an ASIC, and/or other discrete or integrated logic circuitry having similar processing capabilities.

The processing device 602 and the memory 604 can be included in components provided in the FPGA, ASIC, microcontroller, or microprocessor, for example. Memory 604 can include, for example, volatile and non-volatile memory for storing data temporarily or long term, and for storing programmable instructions executable by the processing device 602. Memory 604 can be a removable (e.g., portable) memory for storage of program instructions. I/O I/F 606 can include an interface and/or conductors to couple to the one or more internal components 610 and/or external components 608.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flow diagram and/or block diagram block or blocks.

The computer program instructions may also be loaded onto a computer, other programmable data processing apparatus, or other devices to cause a series of operational operations to be performed on the computer, other programmable apparatus or other devices to produce a computer implemented process such that the instructions which execute on the computer or other programmable apparatus provide processes for implementing the functions/acts specified in the block diagram block or blocks.

Embodiments of device A1 may be implemented or executed by one or more computer systems, such as a microprocessor. Each computer system 600 can be included within device A1 or multiple instances thereof. In the example shown, computer system is embedded in device A1. In various embodiments, computer system 600 may include one or more of a microprocessor, an FPGA, application specific integrated circuit (ASIC), microcontroller. The computer system 600 can be provided as an embedded device. Portions of the computer system 600 can be provided externally, such by way of a centralized computer or the like.

Computer system 600 is only one example of a suitable system and is not intended to suggest any limitation as to the scope of use or functionality of embodiments of the disclosure described herein. Regardless, computer system 600 is capable of being implemented and/or performing any of the functionality set forth hereinabove.

Computer system 600 may be described in the general context of computer system-executable instructions, such as program modules, being executed by a computer system. Generally, program modules may include routines, programs, objects, components, logic, data structures, and so on that perform particular tasks or implement particular abstract data types.

In the preceding, reference is made to various embodiments. However, the scope of the present disclosure is not limited to the specific described embodiments. Instead, any combination of the described features and elements, whether related to different embodiments or not, is contemplated to implement and practice contemplated embodiments. Furthermore, although embodiments may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

The various embodiments disclosed herein may be implemented as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computer program product embodied in one or more computer-readable medium(s) having computer-readable program code embodied thereon.

Any combination of one or more computer-readable medium(s) may be utilized. The computer-readable medium may be a non-transitory computer-readable medium. A non-transitory computer-readable medium may be, for example, but not limited to, an electronic, magnetic, optical, electromagnetic, infrared, or semiconductor system, apparatus, or device, or any suitable combination of the foregoing. More specific examples (a non-exhaustive list) of the non-transitory computer-readable medium can include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages. Moreover, such computer program code can execute using a single computer system or by multiple computer systems communicating with one another (e.g., using a local area network (LAN), wide area network (WAN), the Internet, etc.). While various features in the preceding are described with reference to flowchart illustrations and/or block diagrams, a person of ordinary skill in the art will understand that each block of the flowchart illustrations and/or block diagrams, as well as combinations of blocks in the flowchart illustrations and/or block diagrams, can be implemented by computer logic (e.g., computer program instructions, hardware logic, a combination of the two, etc.). Generally, computer program instructions may be provided to a processor(s) of a general-purpose computer, special-purpose computer, or other programmable data processing apparatus. Moreover, the execution of such computer program instructions using the processor(s) produces a machine that can carry out a function(s) or act(s) specified in the flowchart and/or block diagram block or blocks.

The flowchart and block diagrams in the Figures illustrate the architecture, functionality and/or operation of possible implementations of various embodiments of the present disclosure. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It is to be understood that the above description is intended to be illustrative, and not restrictive. Many other implementation examples are apparent upon reading and understanding the above description. Although the disclosure describes specific examples, it is recognized that the systems and methods of the disclosure are not limited to the examples described herein, but may be practiced with modifications within the scope of the appended claims. Accordingly, the specification and drawings are to be regarded in an illustrative sense rather than a restrictive sense. The scope of the disclosure should, therefore, be determined with reference to the appended claims, along with the full scope of equivalents to which such claims are entitled.

We claim:

1. A method for managing soft errors associated with one or more safety programmable logic controllers (PLCs), the method comprising:

receiving an expected soft error rate for one or more types of input/output (I/O) modules over time;
receiving respective soft error data that was aggregated by respective safety PLCs of the one or more safety PLCs based on soft errors detected by I/O modules coupled to the respective safety PLCs;
determining actual soft error rates per I/O module type based on the received soft error data;
predicting soft error rates for the one or more safety PLCs per I/O module type;
comparing the actual and/or predicted soft error rates to the expected soft error rate per I/O module type;
taking one or more actions in response to a threshold deviation between the actual and/or predicted soft error rates relative to the expected soft error rate for the corresponding I/O module type; and
outputting a visual display of the actual and/or predicted soft error rates, and one or more ranges of deviation for determining when the threshold deviation is reached, wherein the one or more ranges are based on the aggregated amount of soft errors per I/O module type over an expected lifetime for an I/O module of the same type.

2. The method of claim 1, wherein the one or more actions taken include at least one action to reduce the amount of soft errors detected.

3. The method of claim 1, wherein the one or more ranges include a normal soft error range for which no action is taken, an alert soft error range associated with a first amount of deviation and for which the one or more actions is a first type of action, and a warning soft error range associated with a second amount of deviation different from the first amount of deviation and for which the one or more actions is a second type of action is taken.

4. The method of claim 1, further comprising:
in response to determining there is a threshold deviation between the actual and/or predicted soft error rates for a group of safety PLCs of the one or more safety PLCs, determining whether there is a threshold deviation between the actual and/or predicted soft error rate for a subgroup of the group of safety PLCs or an individual safety PLC of the group of safety PLCs; and
identifying which subgroup or individual safety PLC is a cause of the threshold deviation based on a result of determining whether there is a threshold deviation for the subgroup of safety PLCs or the individual safety PLC.

5. The method of claim 1, further comprising:
in response to identifying an individual safety PLC that is a cause of the threshold deviation, comparing soft error rates per I/O module of the safety PLC and/or per semiconductor component of a selected I/O module of the I/O modules of the safety PLC to expected soft error rates per I/O module and/or per semiconductor component; and
identifying one or more of the I/O modules of the safety PLC that is a cause of the threshold deviation and/or one or more semiconductor components of the selected I/O module that is a cause of the threshold deviation based on the comparison to the expected soft error rates per I/O module and/or per semiconductor component.

6. An aggregator communicating with one or more safety PLCs, the aggregator comprising:
a memory configured to store instructions; and
a processor disposed in communication with the memory, wherein the processor, upon execution of the instructions is configured to:
receive an expected soft error rate for one or more types of input/output (I/O) modules over time;
receive respective soft error data that was aggregated by respective one or more safety PLCs based on soft errors detected by I/O modules coupled to the respective one or more safety PLCs;
determine actual soft error rates per I/O module type based on the received soft error data;
predict soft error rates for the one or more safety PLCs per I/O module type;
compare the actual and/or predicted soft error rates to the to the expected soft error rate per I/O module type; and
take one or more actions in response to a threshold deviation between the actual and/or predicted soft error rates relative to the expected soft error rate for the corresponding I/O module type
wherein the processor, upon execution of the instructions, is further configured to output a visual display of the actual and/or predicted soft error rates, and one or more ranges of deviation for determining when the threshold deviation is reached, wherein the one or more ranges are based on the aggregated amount of soft errors per I/O module type over an expected lifetime for an I/O module of the same type.

7. The aggregator of claim 6, wherein the one or more actions taken include at least one action to reduce the amount of soft errors detected.

8. The aggregator of claim 6, wherein the one or more ranges include a normal soft error range for which no action is taken, an alert soft error range associated with a first amount of deviation and for which the one or more actions is a first type of action, and a warning soft error range associated with a second amount of deviation different from the first amount of deviation and for which the one or more actions is a second type of action is taken.

9. The aggregator of claim 6, wherein the processor, upon execution of the instructions, is further configured to:
in response to determining there is a threshold deviation between the actual and/or predicted soft error rates for a group of safety PLCs of the one or more safety PLCs, determine whether there is a threshold deviation between the actual and/or predicted soft error rate for a subgroup of the group of safety PLCs or an individual safety PLC of the group of safety PLCs; and
identify which subgroup or individual safety PLC is a cause of the threshold deviation based on a result of determining whether there is a threshold deviation for the subgroup of safety PLCs or the individual safety PLC.

10. The aggregator of claim 6, wherein the processor, upon execution of the instructions, is further configured to:
in response to identifying an individual safety PLC that is a cause of the threshold deviation, comparing soft error rates per I/O modules of the safety PLC and/or per semiconductor component of a selected I/O module of the I/O modules of the safety PLC to expected soft error rates per I/O module and/or per semiconductor component; and
identify one or more of the I/O modules of the safety PLC that is a cause of the threshold deviation and/or one or more semiconductor components of the selected I/O module that is a cause of the threshold deviation based on the comparison to the expected soft error rates per I/O module and/or per semiconductor component.

11. A method for managing soft errors associated with one or more safety programmable logic controllers (PLCs), the method comprising:
- receiving an expected soft error rate for one or more types of input/output (I/O) modules over time;
- receiving respective soft error data that was aggregated by respective safety PLCs of the one or more safety PLCs based on soft errors detected by I/O modules coupled to the respective safety PLCs;
- determining actual soft error rates per I/O module type based on the received soft error data;
- predicting soft error rates for the one or more safety PLCs per I/O module type;
- comparing the actual and/or predicted soft error rates to the expected soft error rate per I/O module type; and
- taking one or more actions in response to a threshold deviation between the actual and/or predicted soft error rates relative to the expected soft error rate for the corresponding I/O module type, the method further comprising:
- in response to determining there is a threshold deviation between the actual and/or predicted soft error rates for a group of safety PLCs of the one or more safety PLCs, determining whether there is a threshold deviation between the actual and/or predicted soft error rate for a subgroup of the group of safety PLCs or an individual safety PLC of the group of safety PLCs; and
- identifying which subgroup or individual safety PLC is a cause of the threshold deviation based on a result of determining whether there is a threshold deviation for the subgroup of safety PLCs or the individual safety PLC.

12. The method of claim 11, wherein the one or more actions taken include at least one action to reduce the amount of soft errors detected.

13. The method of claim 11, further comprising outputting a visual display of the actual and/or predicted soft error rates, and one or more ranges of deviation for determining when the threshold deviation is reached.

14. The method of claim 13, wherein the one or more ranges are based on the aggregated amount of soft errors per I/O module type over an expected lifetime for an I/O module of the same type.

15. A method for managing soft errors associated with one or more safety programmable logic controllers (PLCs), the method comprising:
- receiving an expected soft error rate for one or more types of input/output (I/O) modules over time;
- receiving respective soft error data that was aggregated by respective safety PLCs of the one or more safety PLCs based on soft errors detected by I/O modules coupled to the respective safety PLCs;
- determining actual soft error rates per I/O module type based on the received soft error data;
- predicting soft error rates for the one or more safety PLCs per I/O module type;
- comparing the actual and/or predicted soft error rates to the expected soft error rate per I/O module type; and
- taking one or more actions in response to a threshold deviation between the actual and/or predicted soft error rates relative to the expected soft error rate for the corresponding I/O module type, the method further comprising:
- in response to identifying an individual safety PLC that is a cause of the threshold deviation, comparing soft error rates per I/O module of the safety PLC and/or per semiconductor component of a selected I/O module of the I/O modules of the safety PLC to expected soft error rates per I/O module and/or per semiconductor component; and
- identifying one or more of the I/O modules of the safety PLC that is a cause of the threshold deviation and/or one or more semiconductor components of the selected I/O module that is a cause of the threshold deviation based on the comparison to the expected soft error rates per I/O module and/or per semiconductor component.

16. The method of claim 15, wherein the one or more actions taken include at least one action to reduce the amount of soft errors detected.

17. The method of claim 15, further comprising outputting a visual display of the actual and/or predicted soft error rates, and one or more ranges of deviation for determining when the threshold deviation is reached.

18. The method of claim 17, wherein the one or more ranges are based on the aggregated amount of soft errors per I/O module type over an expected lifetime for an I/O module of the same type.

* * * * *